F. A. DENNIS.
CLOD CRUSHER.
APPLICATION FILED FEB. 28, 1917.

1,291,780.

Patented Jan. 21, 1919.
2 SHEETS—SHEET 1.

INVENTOR
Frank A. Dennis.

WITNESSES

BY

ATTORNEY

F. A. DENNIS.
CLOD CRUSHER.
APPLICATION FILED FEB. 28, 1917.

1,291,780.

Patented Jan. 21, 1919.
2 SHEETS—SHEET 2.

WITNESSES
F. H. Taylor
Wade Koontz

INVENTOR
Frank A. Dennis.

BY Richard B. Owen.

ATTORNEY

UNITED STATES PATENT OFFICE.

FRANK A. DENNIS, OF FLAGSTAFF, ARIZONA.

CLOD-CRUSHER.

1,291,780.

Specification of Letters Patent. Patented Jan. 21, 1919.

Application filed February 28, 1917. Serial No. 151,530.

*To all whom it may concern:*

Be it known that I, FRANK A. DENNIS, a citizen of the United States, residing at Flagstaff, in the county of Coconino and State of Arizona, have invented certain new and useful Improvements in Clod-Crushers, of which the following is a specification.

This invention relates to agricultural implements and the object of the same is to provide an improved clod crushing machine.

Another object of this invention resides in the production of a machine as set forth, that includes a rotary crusher which is rotated by the supporting wheels of the device and is so connected with the said supporting wheels as to permit the movement of the crusher relative to the ground.

A still further object of this invention resides in the production of a device of the kind above described that is simple in construction, efficient in operation and consists of the minimum number of parts.

With these and other objects in view, this invention consists of certain novel combinations, constructions and arrangement of parts, as will be hereinafter fully described and claimed.

Figure 1:
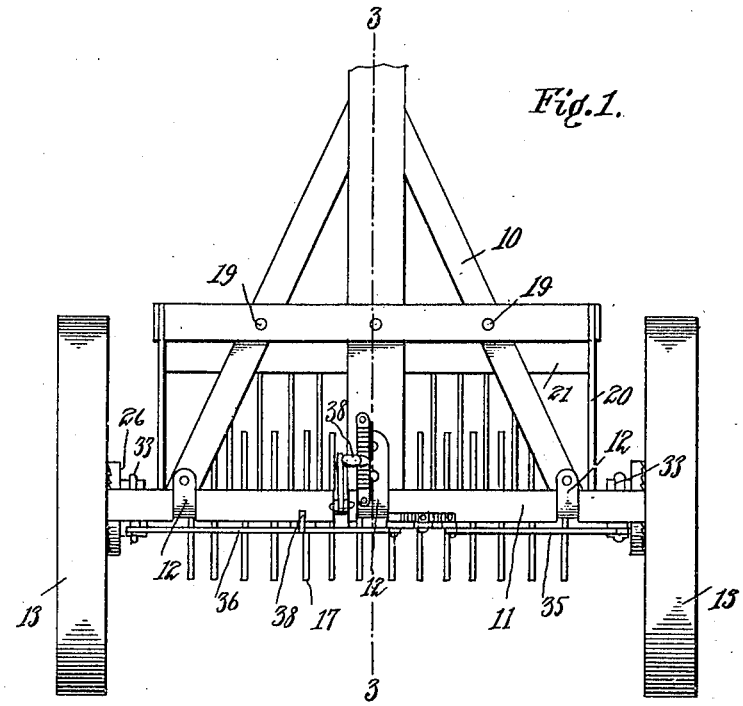
Figure 1 is a top plan view of the improved device.
Figure 2:
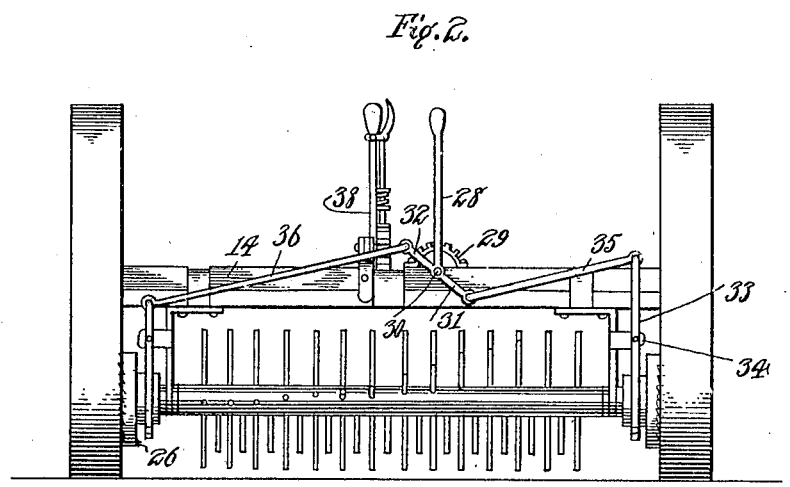
Fig. 2 is a view in front elevation of the device as shown in Fig. 1.

Referring to the parts by reference numerals, the main frame is designated in its entirety by the numeral 10, to which suitable draft means can be applied. The main axle of the device is designated by the numeral 11 and has suitable cut out portions therein to receive the straps 12 that are secured fast to the end of the frame 10 to provide for the attachment of the axle 11 to the said frame. The axle 11 has secured on the ends thereof the supporting wheels 13, the said wheels having on their inner face the gear teeth 14 for a purpose to be hereinafter described.

Figure 4:
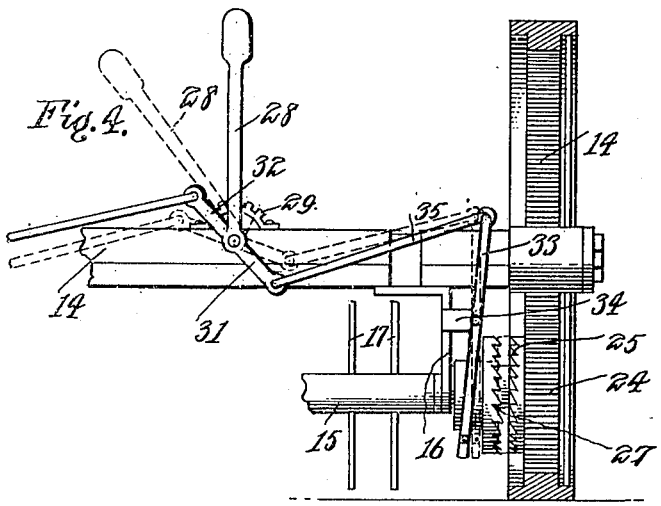
Fig. 4 is a fragmentary view in elevation of a portion of the machine, the supporting wheels thereof being shown in section.

A clod crusher comprising a shaft 15 is rotatably carried by the brackets 16 which are in turn carried by the axle 11. Suitable teeth 17 are carried by this shaft 15 in such relation as to at all times have one of the teeth in engagement with the ground. A transversely extending beam 18 is secured on the frame 10 by the means 19 and pivotally suspended from the said beam, by means of the strips 20 is a second beam 21 that carries the plurality of drag teeth 23 that are arranged so as to allow for the teeth 17 of the crusher to pass therebetween. The ends of the shaft 15 have carried thereon means to provide for the rotation of the crusher at the option of the operator, the said means comprising gear wheels 24 that are loosely carried on the said shaft and are held from longitudinal movement on the shaft 15 by any desired means. The wheels 24 are thus secured in mesh with the teeth 14 on the wheels 13. The inner faces of the wheels 24 are provided with the ratchet teeth 25 and keyed to the shaft 15 for rotary movement therewith and for longitudinal movement relatively thereto are the clutch members designated in their entirety by the numeral 26 the said clutch members each having ratchet teeth 27 formed thereon for engagement with the ratchet teeth formed on the wheels 24 and are also provided with grooves for the reception of suitable operating means. To move the clutch members 26 relatively to the shaft 15 there is provided suitable levers comprising an operating handle 28 having the ordinary rack bar 29 associated therewith for the obvious purpose, the said operating handle 28 being pivoted to the axle 14 as at 30 and having formed integral therewith adjacent its pivot point the arms 31 and 32. The clutch engaging arms 33 are pivotally carried by the projections 34 formed on the brackets 16, the said arms 33 being bifurcated at their lower end to be positioned in the grooves formed in the clutch members for that purpose. Connecting links 35 and 36 connect the arms 33 to the arms 31 and 32 respectively, and by movement of the operating lever 28 to a position as indicated in Fig. 4, the clutch members 26 will be moved so as to engage the ratchet teeth thereof with the ratchet teeth 25 of the gear wheels 24 and when the machine is moved the crusher will be rotated.

Figure 3:
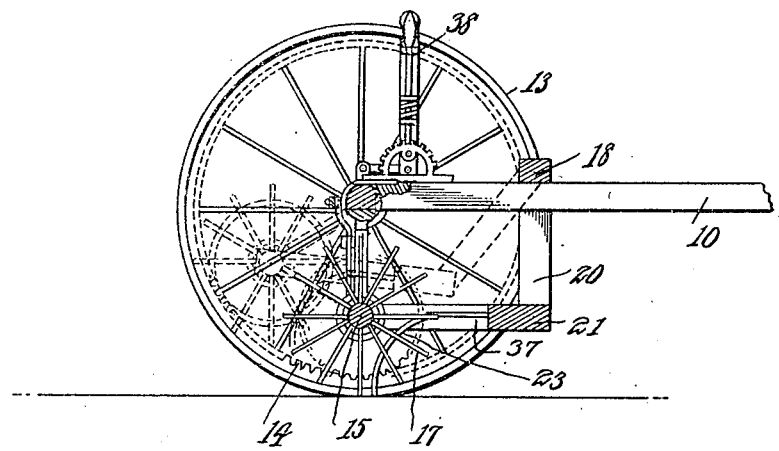
Fig. 3 is a section taken on line 3—3 of Fig. 1.

Suitable means is provided to move the crusher and drag teeth from the position as shown in Fig. 3 to a position indicated in the same figure. The beam 21 is connected with the shaft 15 of the crusher by the strips 37 and thereby the said beam is movable with the shaft relatively to the frame 10. The axle 11 is capable of oscillatory movement relative to the frame 10 by means of the cut out portions formed therein into which the straps 12 are positioned and an operating lever 38 is carried by this axle and by the oscillatory movement of the axle the crusher, being fixedly secured thereto, will move therewith as will also the beam 21, to the position as indicated in Fig. 3.

It is to be noted that this device allows for the movement of the crusher relative to the ground when in operation without disengaging the clutch members from the wheels 24, in that the wheels 24 will move with the clutch and the crusher to the position as indicated in Fig. 3.

It is obvious that minor changes may be made in the form and construction of this invention without departing from the material parts thereof. It is therefore not wished to confine the invention to the exact form herein shown and described, but it is wished to include all such as properly come within the scope claimed.

I claim:

1. In an agricultural implement of the kind described, including a frame, an axle on said frame capable of oscillatory movement relatively thereto, supporting wheels on said axle, a clod crushing roller carried by said axle, a beam pivotally suspended from said frame having drag teeth thereon, means for pivotally connecting said beam with said clod crushing roller, means in engagement with the supporting wheels for imparting rotary movement to said roller and means for manually oscillating said axle to move said clod crushing roller and said beam relatively to the ground.

2. In an agricultural implement of the kind described including a frame, an axle on said frame capable of oscillatory movement, supporting wheels on the axle, a clod crushing means carried by the axle, a beam pivotally suspended from said frame, means for pivotally connecting said beam with said clod crushing means and means in engagement with the supporting wheels for imparting movement to said crushing means, and means for manually oscillating said axle to move said clod crushing means and said beam relatively to the ground.

In testimony whereof I affix my signature in presence of two witnesses.

FRANK A. DENNIS.

Witnesses:
R. B. REYNOLDS,
CHAS. E. PHILLIPS.

Copies of this patent may be obtained for five cents each, by addressing the "Commissioner of Patents, Washington, D. C."